(12) United States Patent
Katayama et al.

(10) Patent No.: US 7,363,181 B2
(45) Date of Patent: Apr. 22, 2008

(54) STRAIGHTNESS CORRECTING METHOD FOR SURFACE TEXTURE MEASURING INSTRUMENT, AND SURFACE TEXTURE MEASURING INSTRUMENT

(75) Inventors: Minoru Katayama, Kure (JP); Takafumi Kano, Kure (JP)

(73) Assignee: Mitutoyo Corporation, Kanagawa (JP)

( * ) Notice: Subject to any disclaimer, the term of this patent is extended or adjusted under 35 U.S.C. 154(b) by 281 days.

(21) Appl. No.: 11/359,527

(22) Filed: Feb. 23, 2006

(65) Prior Publication Data
US 2006/0191328 A1  Aug. 31, 2006

(30) Foreign Application Priority Data
Feb. 28, 2005  (JP) ............................. 2005-053433

(51) Int. Cl.
*G01B 3/14* (2006.01)

(52) U.S. Cl. ................... 702/85; 702/95; 702/127; 702/167; 702/168; 73/105; 33/503; 33/555; 33/572

(58) Field of Classification Search ............... 702/85, 702/95, 127, 167, 168; 73/105, 866.5, 865.8; 33/502, 503, 549, 555, 556, 559, 572, 542
See application file for complete search history.

(56) References Cited

U.S. PATENT DOCUMENTS

| | | | |
|---|---|---|---|
| 4,665,739 A * | 5/1987 | Mizuno ........................ 73/105 |
| 4,765,181 A * | 8/1988 | Numoto et al. ................ 73/105 |
| 4,807,152 A | 2/1989 | Lane et al. |
| 5,838,445 A * | 11/1998 | Sandhu et al. ............... 356/600 |
| 6,453,730 B2 | 9/2002 | Takemura |
| 6,671,973 B2 * | 1/2004 | Takemura et al. ............. 33/551 |
| 6,745,616 B1 * | 6/2004 | Katayama et al. ............ 73/104 |
| 7,036,238 B2 * | 5/2006 | Kojima et al. ................. 33/503 |
| 7,222,434 B2 * | 5/2007 | Kikuchi ......................... 33/503 |
| 7,318,285 B2 * | 1/2008 | Matsumiya et al. ........... 33/561 |
| 2001/0029778 A1 * | 10/2001 | Takemura ..................... 73/104 |
| 2002/0059041 A1 * | 5/2002 | Mills .......................... 702/127 |
| 2002/0170196 A1 * | 11/2002 | Takemura et al. ............. 33/551 |
| 2004/0260509 A1 * | 12/2004 | Noda .......................... 702/168 |
| 2005/0011078 A1 * | 1/2005 | Kubota ......................... 33/551 |
| 2005/0022409 A1 * | 2/2005 | Yamamoto et al. ........... 33/558 |
| 2007/0056176 A1 * | 3/2007 | Matsumiya et al. .......... 33/551 |
| 2007/0118329 A1 * | 5/2007 | Goto et al. .................. 702/167 |
| 2007/0266781 A1 * | 11/2007 | Nemoto et al. ............... 73/105 |
| 2007/0295100 A1 * | 12/2007 | Igasaki et al. ................ 73/818 |

FOREIGN PATENT DOCUMENTS

JP    A 11-118473    4/1999

* cited by examiner

*Primary Examiner*—Carol S Tsai
(74) *Attorney, Agent, or Firm*—Oliff & Berridge, PLC

(57) ABSTRACT

A surface texture measuring instrument is provided that is capable of performing a correction operation depending on the rotation angle position of a detector even when the detector is rotated for measurement.

11 Claims, 12 Drawing Sheets

STRAIGHTNESS CORRECTING METHOD FOR SURFACE TEXTURE MEASURING INSTRUMENT, AND SURFACE TEXTURE MEASURING INSTRUMENT

BACKGROUND

A surface texture measuring instrument may be used for measuring the surface roughness of a measurement work, such as the surface rising and falling, the contour, or other features of the measurement work. The surface texture measuring instrument may include a detector that supports, to be displaceable, a stylus having a sensing pin at the tip end to be touched on the surface of the measurement work, and a drive unit that moves the detector in a measurement direction.

With such a surface texture measuring instrument, the sensing pin of the detector is touched onto the measurement surface of the measurement work. In this state, when the detector is moved in the measurement direction by the drive unit, some displacement is observed to the sensing pin depending on the rising and falling of the measurement surface of the measurement work. The resulting displacement of the sensing pin is used as a basis to measure the surface roughness, the surface rising and falling, or others of the measurement work.

Due to such measurement principles, to measure the surface texture such as the surface roughness of the measurement work with high accuracy, there needs to highly accurately keep the drive unit straight with the reason that the detector is moved linearly in the measurement direction. The problem here is that the straightness accuracy of the drive unit exerts an influence on the measurement operation due to the limitations of the drive unit in view of processing and assembly accuracy.

To solve such a problem, JP-A-11-118473 proposed a data processor of a surface roughness and contour measuring instrument. The surface roughness and contour measuring instrument is provided with a pickup that detects any displacement observed to a sensing pin to be touched on the measurement surface of a measurement work, and a drive mechanism that moves the pickup. In the instrument, at shipment or others, the straightness accuracy of the drive mechanism is stored in advance in storage means as correction data through measurement of an optical flat. At the actual measurement, the correction data stored in the storage means is subtracted from the measurement data so that any deviation component in view of the straightness accuracy of the drive mechanism is eliminated from the measurement data.

SUMMARY

With the surface roughness and contour measuring instrument of JP-A-11-118473, the sensing pin is oriented downward to touch the optical flat, and the measurement operation is performed while the pin is in such a state, thereby the straightness accuracy of the drive mechanism is stored as correction data. This thus possibly leads to a highly-accurate correction operation as long as the measurement work is measured with the same conditions as those for the optical flat.

Recently proposed is a surface texture measuring instrument of a type in which a sensing pin can be differently oriented to allow measurement of the surface roughness of the vertical surface of a workpiece, the surface roughness of an inner side wall or upper wall of a hole, or the like. To be more specific, the proposed surface texture measuring instrument is provided with a detector rotation mechanism, with which a detector supporting, to be displaceable, a stylus having a sensing pin at the tip end to be touched on the surface of a measurement work is rotated about an axis substantially parallel to an axis of the stylus.

With such a surface texture measuring instrument, when the detector is rotated, the straightness accuracy of the drive unit varies depending on the measurement posture, which is determined by the rotation angle position of the detector. Therefore, there is such a problem that the correcting method of JP-A-11-118473 does not possibly lead to a correction operation with accuracy.

Thus, a straightness correcting method is provided for a surface texture measuring instrument that improves performing a correction operation in relation to the posture of a detector even if the detector is changed in posture for measurement, and such a surface texture measuring instrument.

A straightness correcting method for a surface texture measuring instrument is disclosed as a straightness correcting method for a surface texture measuring instrument that includes a detector that detects the surface texture of a measurement work, a drive unit that moves the detector relatively to a measurement direction, and a detector posture change mechanism that changes the detector in posture. The method includes: a correction data storage step of storing, to a storage device, detector correction data derived for every movement position of the drive unit in relation to each of different postures set to the detector to take; a measurement data acquisition step of acquiring, at measurement, as measurement data, the movement positions of the drive unit and a detection amount of the detector while driving the drive unit in the state that the detector is set by the detector posture change mechanism to any of the postures corresponding to the measurement surface of the measurement work, and in the state that the detector is made capable of detecting the surface texture of the measurement surface of the measurement work; and a correction calculation step of reading out any of the detector correction data in agreement with or in closest agreement with the posture of the detector at measurement from the storage device, and correcting the measurement data using the detector correction data.

According to an embodiment of the disclosure, in the correction data storage step, the storage device stores detector correction data at every possible movement position for the drive unit in relation to each of different postures set to the detector to take. Thereafter, in the measurement data acquisition step, when the measurement operation is preformed, measurement data is captured. That is, in the state that the detector posture change mechanism sets the detector to be in the posture corresponding to the measurement surface of the measurement work, and in the state that the detector is made capable of detecting the surface texture of the measurement surface of the measurement work, when the drive unit is driven, the movement positions of the drive unit and a detection amount of the detector are captured as measurement data. Thereafter, in the correction calculation step, reading is performed from the storage device for any of the detector correction data in agreement with or in closest agreement with the posture of the detector at measurement, and the detector correction data is used to correct the measurement data.

As such, even if the detector is changed in posture for measurement, the measurement data is accordingly corrected based on the detector correction data in agreement with or in closest agreement with the posture of the detector at measurement so that the correction operation can be optimally performed in relation to the posture of the detector at measurement.

In the straightness correcting method for the surface texture measuring instrument, the correction data storage step preferably stores, to the storage device, the detector correction data derived for the movement positions of the drive unit in relation to each of a plurality of postures set to the detector to take at a predetermined interval.

According to an embodiment, the storage device is storing the detector correction data at every possible movement position for the drive unit in relation to each of a plurality of postures set to the detector to take at a predetermined interval. This thus enables a highly-accurate correction operation not only for various postures of the detector (for example, at 0 degree with which the roughness of the measurement work is detected in the vertical direction, at 45 degrees, at 90 degrees with which the roughness is detected in the lateral direction, and others), but also for postures angled close to such angles.

A straightness correcting method for a surface texture measuring instrument provided as is a straightness correcting method for a surface texture measuring instrument that includes a detector that detects the surface texture of a measurement work, a drive unit that moves the detector relatively to a measurement direction, and a detector posture change mechanism that changes the detector in posture. The method includes: a correction data storage step of storing, to a storage device, detector correction data derived for every movement position of the drive unit in relation to each of at least two different postures set to the detector to take; a measurement data acquisition step of acquiring, at measurement, as measurement data, the movement positions of the drive unit and a detection amount of the detector while driving the drive unit in the state that the detector is set by the detector posture change mechanism to any of the postures corresponding to the measurement surface of the measurement work, and in the state that the detector is made capable of detecting the surface texture of the measurement surface of the measurement work; and a correction calculation step of calculating correction data in agreement with the posture of the detector at measurement based on the posture of the detector at measurement, and at least two of the detector correction data stored in the storage means, and correcting the measurement data using the correction data.

According to an embodiment, in the correction data storage step, the storage device stores detector correction data at every possible movement position for the drive unit in relation to each of at least two different postures set to the detector to take. Thereafter, in the measurement data acquisition step, when the measurement operation is preformed, measurement data is captured. That is, in the state that the detector posture change mechanism sets the detector to be in the posture corresponding to the measurement surface of the measurement work, and in the state that the detector is made capable of detecting the surface texture of the measurement surface of the measurement work, when the drive unit is driven, the movement positions of the drive unit and a displacement amount of the detector are captured as measurement data. Thereafter, in the correction calculation step, calculation is performed to derive correction data in agreement with the posture of the detector at measurement based on the posture of the detector at measurement, and two of the detector correction data stored in the storage means, and the measurement data is corrected using the correction data.

As such, even if the detector is changed in posture for measurement, correction data in agreement with the posture of the detector at measurement is calculated based on the posture of the detector at measurement and two of the detector correction data stored in the storage means, and the measurement data is accordingly corrected based on the correction data. Therefore, the correction operation can be optimally performed in relation to the posture of the detector at measurement. Specifically, the storage device only needs to store detector correction data for the movement positions of the drive unit in relation to at least two different postures of the detector to take so that the correction operation can be optimally performed with the less amount of data.

A surface texture measuring instrument is provided as a surface texture measuring instrument including a detector that supports, to be displaceable, a stylus having a sensing pin at the tip end to be touched on the surface of a measurement work, a drive unit that moves the detector relatively to a measurement direction, and a detector rotation mechanism that rotates the detector about an axis being substantially parallel to an axis of the stylus. The instrument may include: a correction data storage for storing detector correction data derived for every movement position of the drive unit in relation to each of different rotation angle positions set to the detector to take; a measurement data storage for storing, at measurement, as measurement data, the movement positions of the drive unit and a displacement amount of the detector when the drive unit is driven in the state that the detector is set by the detector rotation mechanism to any of the rotation angle positions corresponding to the measurement surface of the measurement work, and in the state that the sensing pin is being touched on the measurement surface of the measurement work; and a correction calculation device for reading out any of the detector correction data in agreement with or in closest agreement with the rotation angle position of the detector at measurement from the storage, and correcting the measurement data stored in the measurement data storage using the detector correction data.

Such a surface texture measuring instrument can also lead to the similar effects as the straightness correcting method described above.

Another surface texture measuring instrument is provided as a surface texture measuring instrument including a detector that supports, to be displaceable, a stylus having a sensing pin at the tip end to be touched on the surface of a measurement work, a drive unit that moves the detector relatively to a measurement direction, and a detector rotation mechanism that rotates the detector about an axis being parallel to an axis of the stylus. The instrument may include: a correction data storage for storing detector correction data derived for every movement position of the drive unit in relation to each of at least two rotation angle positions set to the detector to take with a difference of a predetermined angle therebetween; a measurement data storage for storing, at measurement, as measurement data, the movement positions of the drive unit and a displacement amount of the detector when the drive unit is driven in the state that the detector is set by the detector rotation mechanism to any of the rotation angle positions corresponding to the measurement surface of the measurement work, and in the state that the sensing pin is being touched on the measurement surface of the measurement work; and a correction calculation device for calculating correction data in agreement with the rotation angle position of the detector at measurement based on the rotation angle position of the detector at measurement, and two of the detector correction data stored in the correction data storage, and correcting the measurement data using the correction data.

Such a surface texture measuring instrument can also lead to the similar effects as the straightness correcting method described above.

These and other features and details are described in, or are apparent from, the following detailed description.

BRIEF DESCRIPTION OF THE DRAWINGS

Various exemplary details of systems and methods are described, with reference to the following figures, wherein.

DETAILED DESCRIPTION OF EMBODIMENTS

Figure 1:
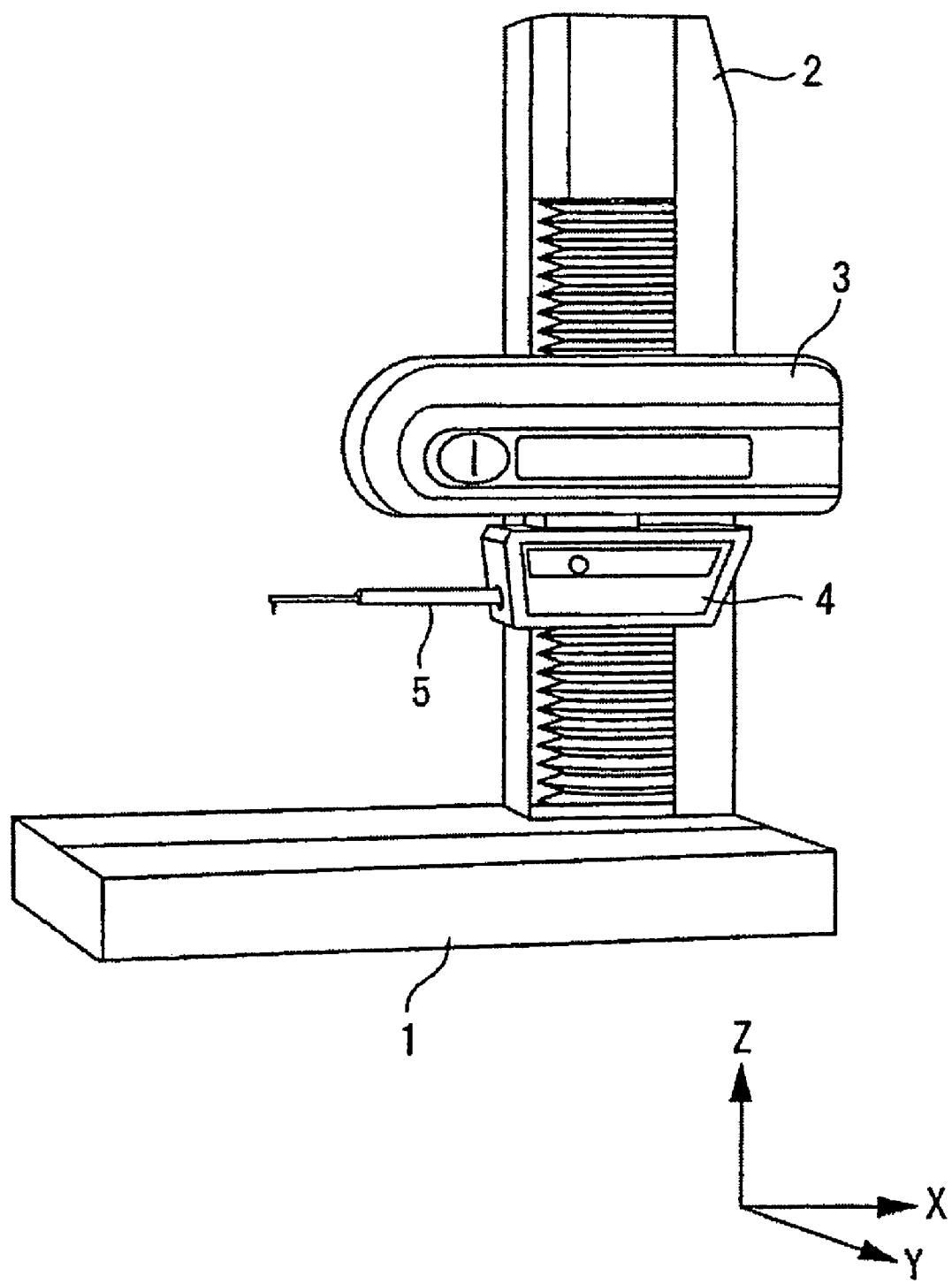
FIG. 1 shows a perspective view of an exemplary embodiment of a surface roughness measuring instrument.

FIG. 1 is a perspective view of a surface roughness measuring instrument of an exemplary embodiment. This surface roughness measuring instrument may be configured to include a base 1, a support 2 provided to stand on the base 1, an X-axis drive unit 3 provided to the support 2 to be able to move in the vertical direction, a detector rotation unit 4 serving as a detector posture change mechanism that is moved by the X-axis drive unit 3 into a direction (X-axis direction) orthogonal to the support 2, and a roughness detector 5 that is changed in posture by being rotated by the detector rotation unit 4 about an X-axis (axis being substantially parallel to an axis of a stylus 5C that will be described later).

Figure 2:
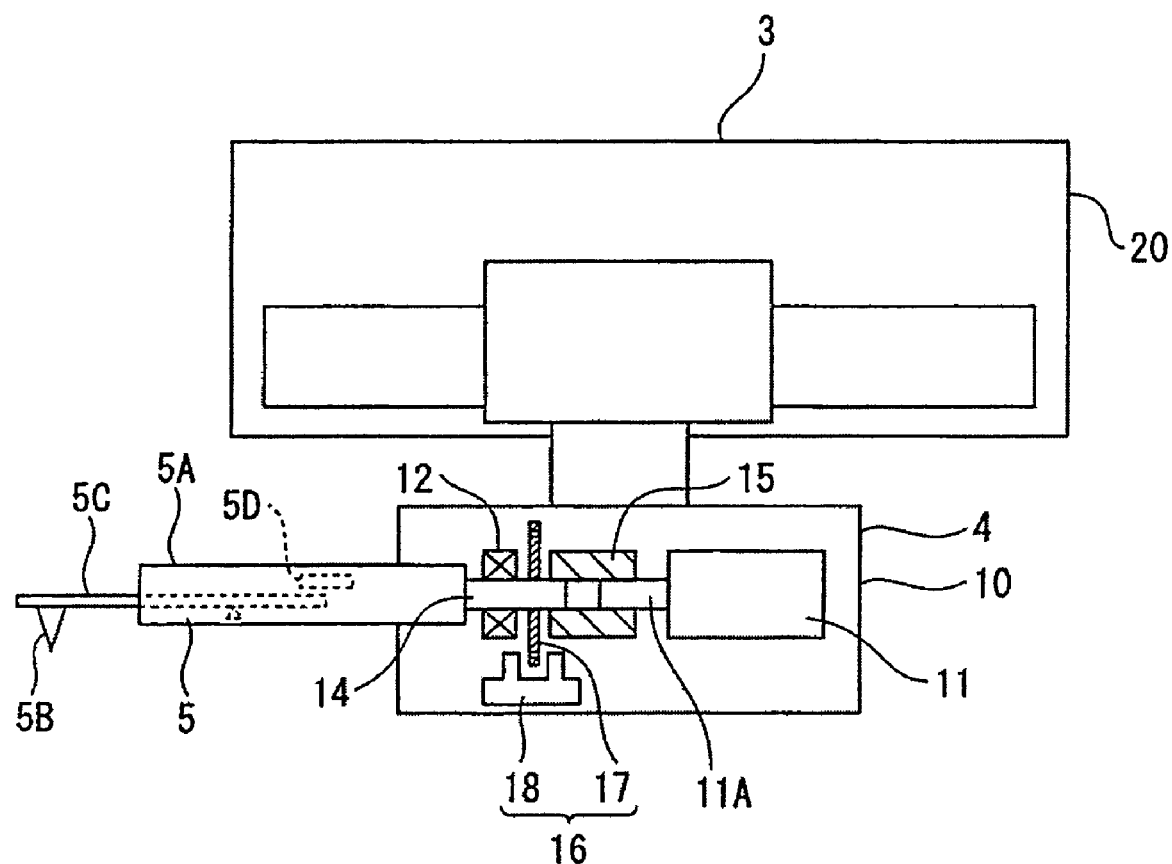
FIG. 2 shows a schematic view of a detector rotation unit of the embodiment in FIG. 1.

FIG. 2 is a schematic diagram showing the detector rotation unit 4. The detector rotation unit 4 may be configured to include a cabinet 10 that is moved by the X-axis drive unit 3 in the X-axis direction, a motor 11 fixed inside of the cabinet 10, a rotation axis 14 that is supported inside of the cabinet 10 to be rotatable on the same axis as an output axis 11A of the motor 11 via a bearing 12, and keeping hold of the roughness detector 5 at the tip end thereof, an axis joint 15 that couples together the rotation axis 14 and the output axis 11A of the motor 11, and an angle detection sensor 16 that detects the rotation angle position of the rotation axis 14 (the roughness detector 5).

The angle detection sensor 16 may be configured to include a rotation disk 17 that is fixed to the rotation axis 14, and including transparent holes at a regular pitch along the outer rim, and a detection head 18 including a light-emitting element and a light-receiving element, those of which are so disposed as to oppose to each other with the rotation disk 17 therebetween.

The roughness detector 5 may be configured to include a detector main body 5A, the stylus 5C that is supported by the detector main body 5A to be displaceable (swingable), and from its tip end, a sensing pin 5B is protruding at substantially 90 degrees, and a detection section 5D that detects any displacement (swinging motion) of this stylus 5C.

Figure 3:
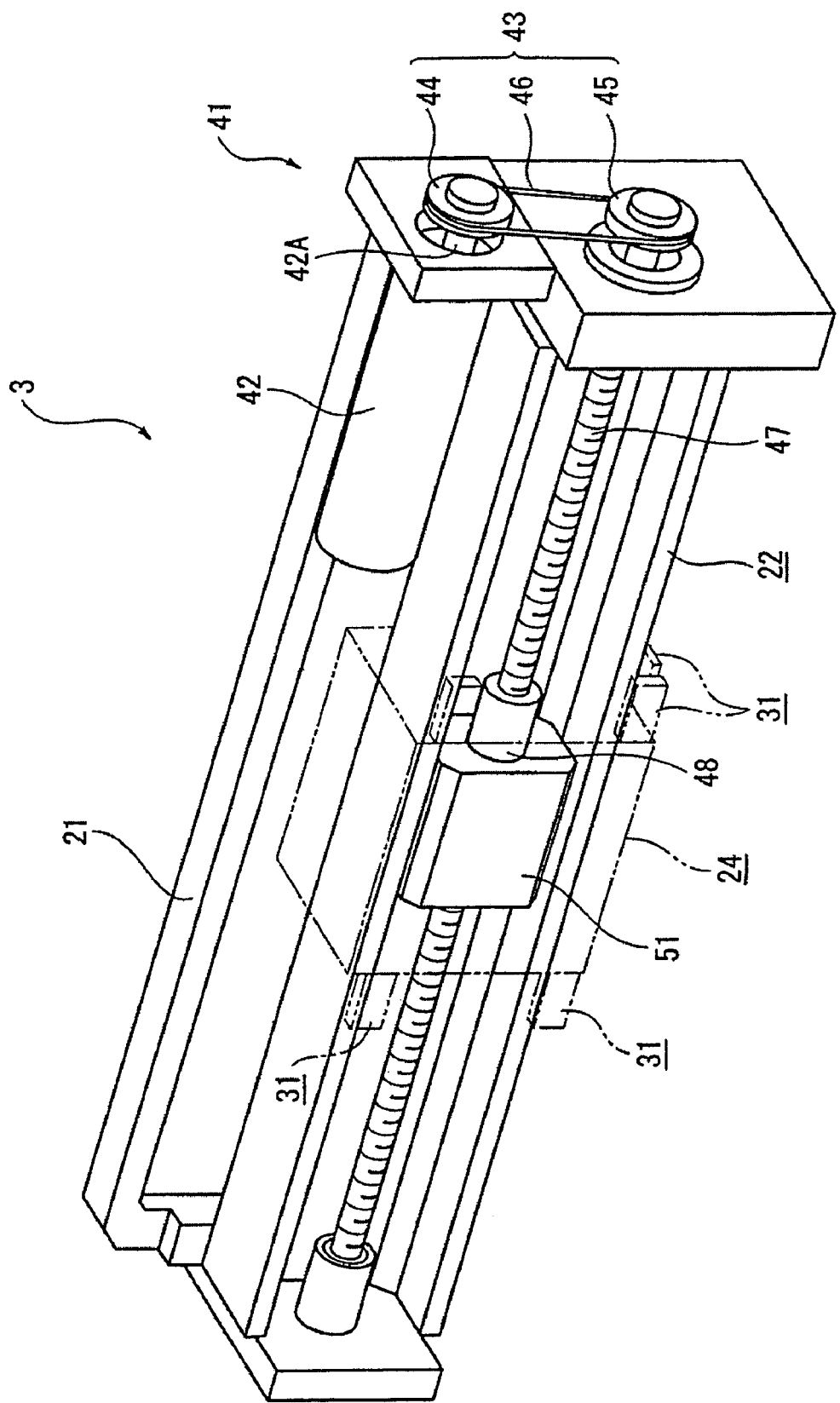
FIG. 3 shows a perspective view of an X-axis drive unit of the embodiment in FIG. 1.

FIG. 3 is a perspective view of the X-axis drive unit 3. The X-axis drive unit 3 may be configured to include a cabinet 20 provided along the support 2 to be able to move in the vertical direction (refer to FIG. 2), a frame 21 fixed inside of the cabinet 20 (see FIG. 2), a guide rail 22 whose both ends are supported by the frame 21, a slider 24 provided along the guide rail 22 to be swingable, and is keeping hold of the detector rotation unit 4, biasing means 31 for biasing the slider 24 in such a direction that the sliding surface of the slider 24 abuts the guide surface of the guide rail 22, and drive means 41 for moving the slider 24 along the guide rail 22.

Figure 4:
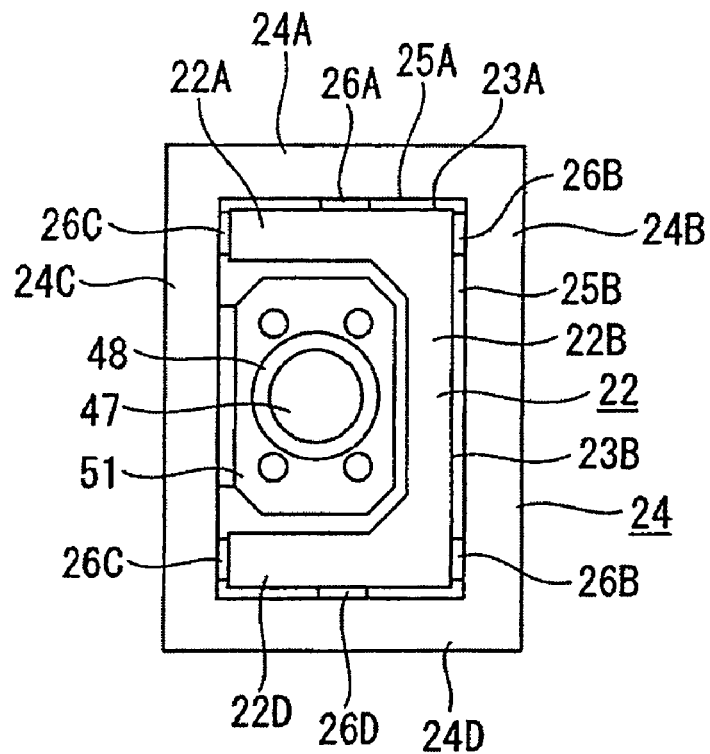
FIG. 4 shows a vertical cross sectional view of the X-axis drive unit of the embodiment in FIG. 1.

The guide rail 22 may be formed to have the horizontally-oriented U-shape in cross section with two guide surfaces, which are so disposed as to form a predetermined angle therebetween, being both parallel to the movement direction of the roughness detector 5. For example, as shown in FIG. 4, the guide rail is formed to have the horizontally-oriented U-shape in cross section with an upper wall 22A, a side wall 22B that extends downward at 90 degrees from an end of the upper wall 22A to be a piece therewith, and a lower wall 22D that extends in the horizontal direction from a lower end of the side wall 22B to be parallel to and be a piece with the upper wall 22A. On the outer side surface of the upper wall 22A, a first guide surface 23A is formed, and on the outer side surface of the side wall 22B, a second guide surface 23B is formed. The first guide surface 23A and the second guide surface 23B are with assurances of straightness accuracy, and both are used as straightness reference surfaces when the slider 24 is driven in the X-axis direction.

The slider 24 may be formed to configure a rectangular frame in cross section including the guide rail 22 therein. For example, as shown in FIG. 4, the slider is formed to configure a vertically-longer rectangular frame in cross section, including an upper wall 24A, side walls 24B and 24C, and a lower wall 24D. The inner surface of the upper wall 24A and the inner surface of the side wall 24B are formed with two sliding surfaces opposing to the two guide surfaces 23A and 23B of the guide rail 22, i.e., a first sliding surface 25A and a second sliding surface 25B, respectively.

Between the inner surfaces of the slider 24, i.e., those of the upper wall 24A, the side walls 24B and 24C, and the lower wall 24D, and the outer surfaces of the guide rail 22, i.e. those of the upper wall 22A, the side wall 22B, and the lower wall 22D, sliding members 26A, 26B, 26C, and 26D are disposed, respectively. Herein, between the inner surface of the upper wall 24A of the slider 24 and the outer surface of the upper wall 22A of the guide rail 22, the sliding member 26A is provided at the center in the width direction. Between the inner surface of the lower wall 24D of the slider 24 and the outer surface of the lower wall 22D of the guide rail 22, the sliding member 26D is provided at the center in the width direction. Between the inner surface of the side wall 24B of the slider 24 and the outer surface of the side wall 22B of the guide rail 22, the sliding member 26B is provided above the other sliding member 26B. Between the inner surface of the side wall 24C of the slider 24 and the end surface of the upper wall 22A of the guide rail 22, the sliding member 26C is provided, and between the inner surface of the side wall 24C of the slider 24 and the end surface of the lower wall 22D, the other sliding member 26C is provided.

Figure 5:
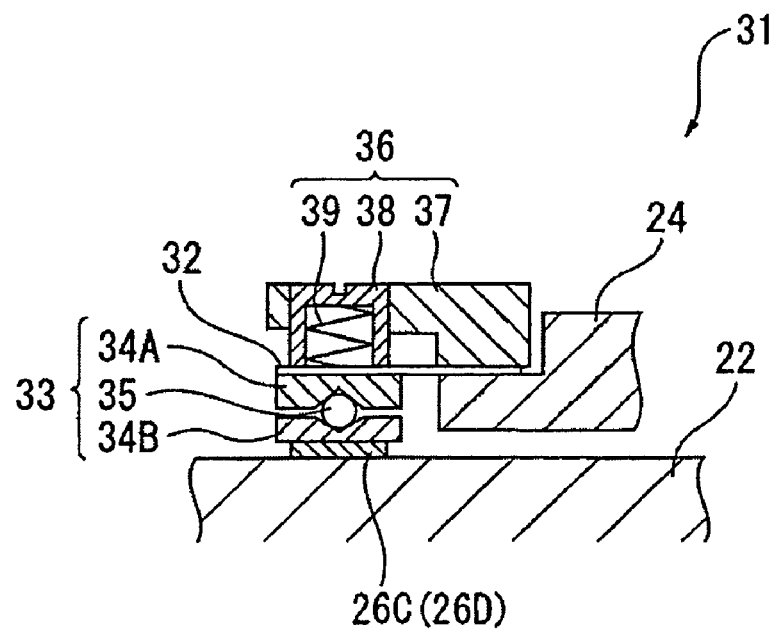
FIG. 5 is a diagram showing a biasing member for use in the X-axis drive unit of the embodiment of FIG. 1.

The biasing member 31 may be provided to the surfaces opposing to the two sliding surfaces 26A and 26B of the slider 24, i.e., the lower wall 24D and the side wall 24C. As shown in FIG. 5, the biasing members 31 are each configured to include a leaf spring 32 whose one end is fixed to the slider 24, the sliding members 26C and 26D provided to the other end of the leaf spring 32 via a swing mechanism 33, and a biasing force adjustment mechanism 36 that is provided on the side opposite to the sliding members 26C and 26D with the leaf spring 32 therebetween to bias the leaf spring 32 in such a direction that the sliding members 26C and 26D abut the guide rail 22, and is capable of adjusting the biasing force.

The swing mechanism 33 may be disposed between the leaf spring 32 and the sliding members 26C and 26D, and is configured to include two plates 34A and 34B forming a conical groove at the center of their inner surfaces facing to each other, and a steel ball 35 that is accommodated in the conical groove of the two plates 34A and 34B.

The biasing force adjustment mechanism 36 may be configured to include an attachment member 37 fixed to the slider 24, an adjustment screw 38 screwed into the attachment member 37, and a spring 39 housed inside of the adjustment screw 38.

The driver 41 may be to include a motor 42 that is fixed to the frame 21 to be parallel to the guide rail 22, a ball screw axis 47 fixed to the frame 21 to be parallel to the guide rail 22, and serves as a feed screw axis that transmits the rotation of the motor 42 via a rotation transmission mechanism 43, and a nut member 48 that is screwed into the ball screw axis 47, and coupled to the slider 24 via a universal joint 51.

The rotation transmission mechanism 43 may be configured to include a pulley 44 attached to an output axis 42A of the motor 42, a pulley 45 fixed to one end of the ball screw axis 47, and a belt transmission mechanism configured by a belt 46 that is wound around between the pulleys 44 and 45. Note here that the rotation transmission mechanism 43 is not limited to the belt transmission mechanism, and may be a gear transmission mechanism, a chain transmission mechanism, or the like.

The ball screw axis 47 may be disposed in the vicinity of the substantial center of four sliding surfaces of the guide rail 22 and the slider 24 (the inner surface of the upper wall 24A of the slider 24, the inner surface of the lower wall 24D thereof, and the inner walls of the side walls 24B and 24C thereof). To be more specific, the ball screw axis 47 is disposed at substantially the center in the horizontally-oriented-U-shape inner space of the guide rail 22.

The universal joint 51 may be so configured as to allow small displacement of the nut member 48 in the axis-orthogonal direction of the ball screw axis 47.

Figure 6:
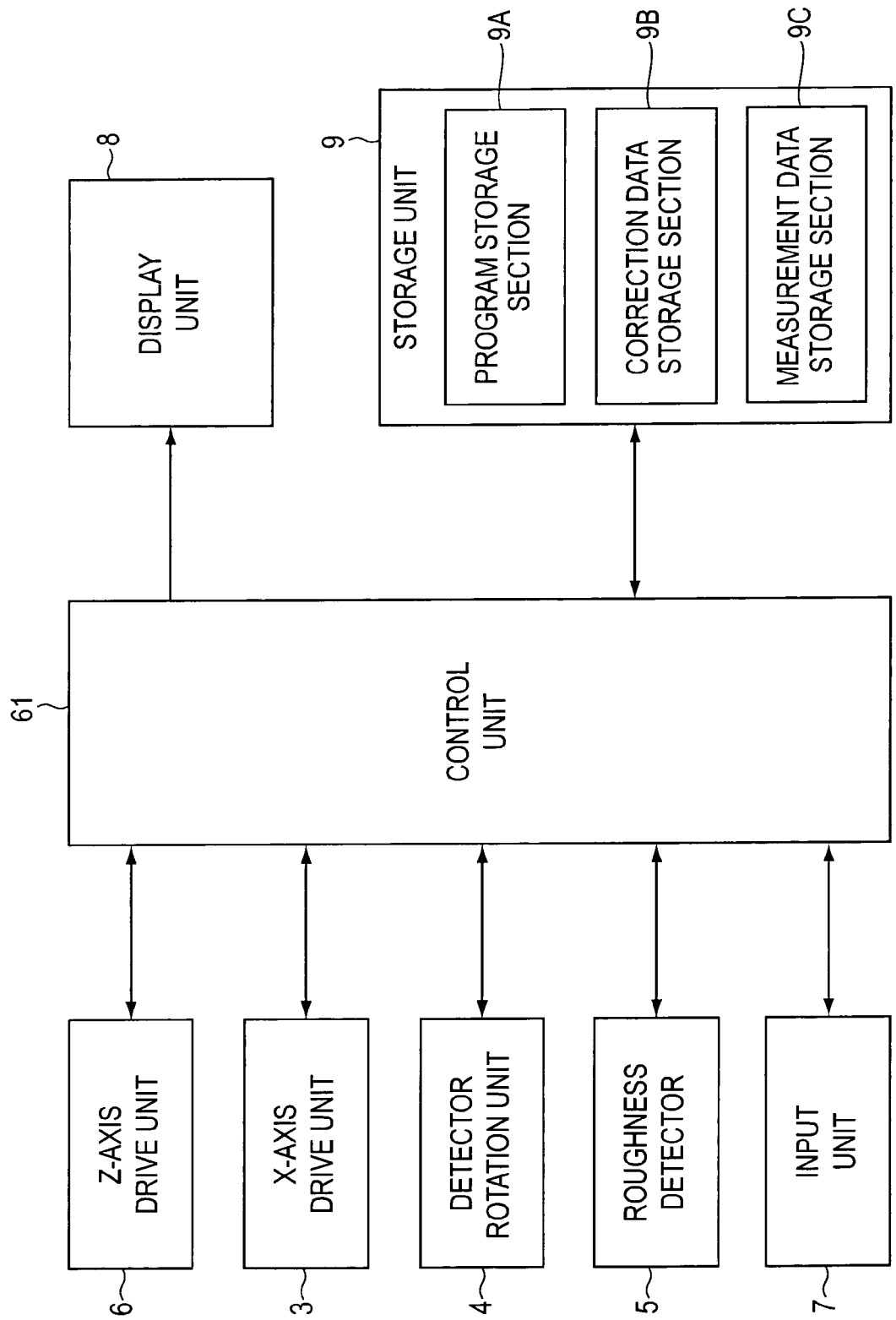
FIG. 6 is a block diagram showing a control unit and its main components of the embodiment in FIG. 1.

FIG. 6 is a block diagram of a control unit. A control unit 61 may be connected with a Z-axis drive unit 6 that moves the X-axis drive unit 3 in the vertical direction, the X-axis drive unit 3, the detector rotation unit 4, the roughness detector 5, an input unit 7, a display unit 8, and a storage unit 9.

From the input unit 7, various command information may include a measurement item selection command, a measurement start command, or the like.

The display unit 8 may display the measurement items, the measurement result, or the like.

The storage unit 9 may be provided with a program storage section 9A storing an operation command program for each of the measurement items, or others, a correction data storage section 9B serving as a correction data storage, a measurement data storage section 9C serving as a measurement data storage, and the like.

Figure 7:
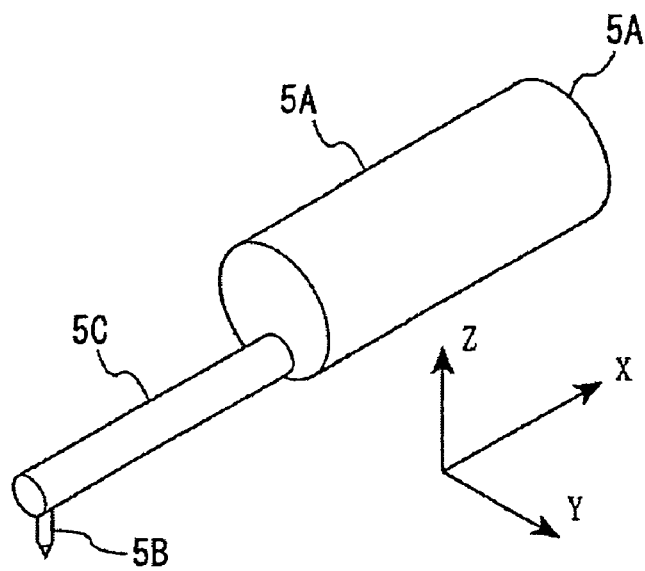
FIG. 7 is a diagram showing a reference axis in a roughness detector of the embodiment of FIG. 1.
Figure 8A:
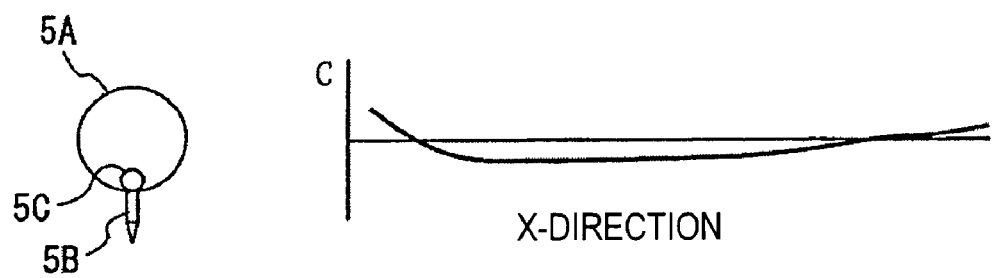
FIG. 8 is a diagram showing detector correction data stored in a correction data storage section in the embodiment of FIG. 1.
Figure 8B:
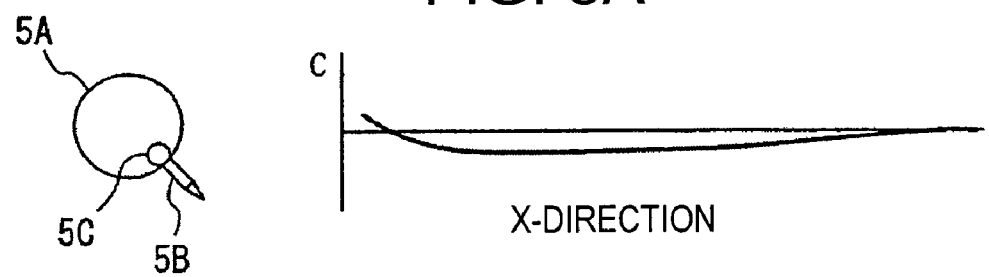
Figure 8C:

The correction data storage section 9B may store detector correction data at every possible movement position of the X-axis drive unit 3 in relation to various different rotation angle positions set to the roughness detector 5 to take. For example, as shown in FIG. 7, assume that the reference axis direction of the stylus 5C of the roughness detector 5 is X direction, and the directions orthogonal thereto are Z and Y directions. With this being the case, as shown in FIG. 8, in relation to the rotation angle positions at which the roughness detector 5 is set to a plurality of rotation angle positions at every 45 degrees, the detector correction data is stored for the respective movement positions of the X-axis drive unit 3. That is, in relation to the rotation angle position (0 degree) at which the sensing pin 5B is oriented downward, the rotation angel position (45 degrees) at which the sensing pin 5B is oriented downward at 45 degrees, and the rotation angle position (90 degrees) at which the sensing pin 5B is oriented sideward, detector correction data C is stored for the respective movement positions of the X-axis drive unit 3.

Note here that the stylus 5C swings in response to the surface rising and falling of a measurement work, and although the axis direction thereof is not always directed to the X direction, the reference axis direction herein is the axis direction when the axis direction of the stylus 5C being parallel to the X direction.

The measurement data storage section 9C may store, at measurement, as measurement data, the movement positions of the X-axis drive unit 3 when the X-axis drive unit 3 is driven, and the displacement amount of the roughness detector 5 (the displacement amount of the stylus 5C) in the state that the roughness detector 5 (the sensing pin 5B) is set by the detector rotation unit 4 to the rotation angle position corresponding to the measurement surface of a measurement work, and in the state that the sensing pin 5B is being touched on the measurement surface of the measurement work.

The control unit 61 may be configured to include a correction calculation device that reads out, from the correction data storage section 9B, the detector correction data in agreement with or in closest agreement with the rotation angle position of the roughness detector 5 at measurement, and using the resulting detector correction data, corrects the measurement data stored in the measurement data storage section 9C.

Described next are the effects of the present embodiment.

At the time when the surface texture of a measurement work is measured, first of all, the measurement work may be placed on the base 1 using a Y-axis table or others. After the sensing pin 5B of the roughness detector 5 is touched to the surface of the measurement work, the roughness detector 5 is moved along the surface of the measurement work.

Herein, for placement of the measurement work, the Y-axis table is not always needed. Using the Y-axis table, however, eases positioning of the measurement work in the Y-axis direction (direction orthogonal to both the X-axis direction and the Z-axis direction), and enables to determine the Y-axis direction position with accuracy. Such a Y-axis table may be the one moving or positioning the measurement work manually or automatically.

For movement of the roughness detector 5 along the surface of the measurement work, rotating the motor 42 provided to the X-axis drive unit 3 will do. In response, the rotation force of the motor 42 is transmitted to the ball screw axis 47 via the rotation transmission mechanism 43. Once the ball screw axis 47 is rotated, the nut member 48 screwed into the ball screw axis 47 moves forward or backward so that the slider 24 and the roughness detector 5 fixed to the nut member 48 move forward or backward (move) along the guide rail 22. Once the roughness detector 5 is moved along the surface of the measurement work, from any displacement observed to the sensing pin 5B (the stylus 5C) in the vertical direction, the surface roughness or others of the measurement work is detected.

Here, for changing of the orientation of the sensing pin 5B of the stylus 5C, a command is issued from the input unit 7 about the orientation of the sensing pin 5B. In response, the motor 11 provided to the detector rotation unit 4 is rotated. Once the motor is rotated, the rotation axis 14 is also rotated, and as a result, the roughness detector 5 is rotated. The rotation angle of the roughness detector 5 is detected by the angle detection sensor 16, and the resulting angle information is provided to the control unit 61. When the angle information provided by the angle detection sensor 16 is the same as the angle that is previously input, the control unit 61 stops driving of the motor 11. In this manner, the sensing pin 5B of the stylus 5C is set to any designated orientation.

By changing the orientation of the sensing pin 5B of the stylus 5C depending on the measurement portion of a measurement work, the following measurement may be implemented together with the downward measurement.

Figure 9:
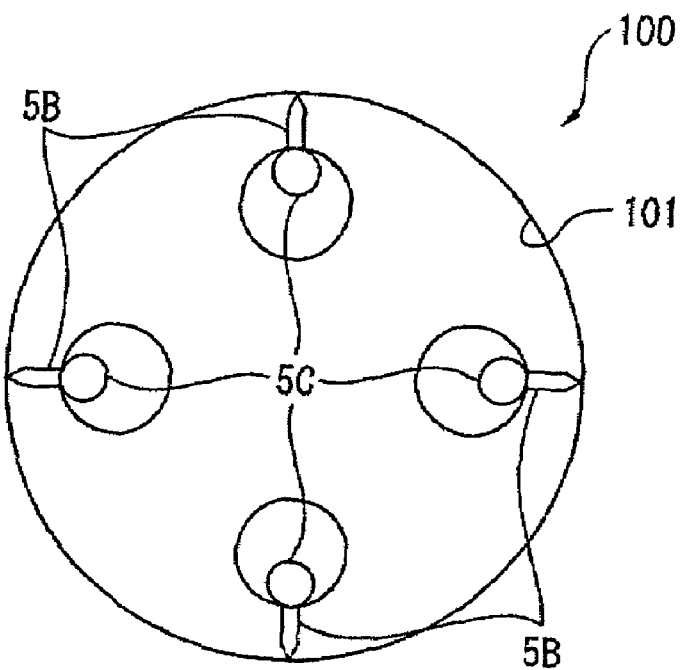
FIG. 9 is a diagram showing an exemplary measurement in which the roughness detector is rotated in the embodiment of FIG. 1.

FIG. 9 shows an example of measuring the surface roughness of the inner surface of a hole 101 of a measurement work 100. With the posture that the sensing pin 5B is oriented downward, the bottom side surface of the inner surface of the hole 101 is subjected to the measurement operation. With the posture that the sensing pin 5B is oriented sideward, the side surface of the inner surface of the hole 101 can be subjected to the measurement operation, and with the posture that the sensing pin 5B is oriented upward, the top side surface of the inner surface of the hole 101 may be subjected to the measurement operation.

Figure 10:
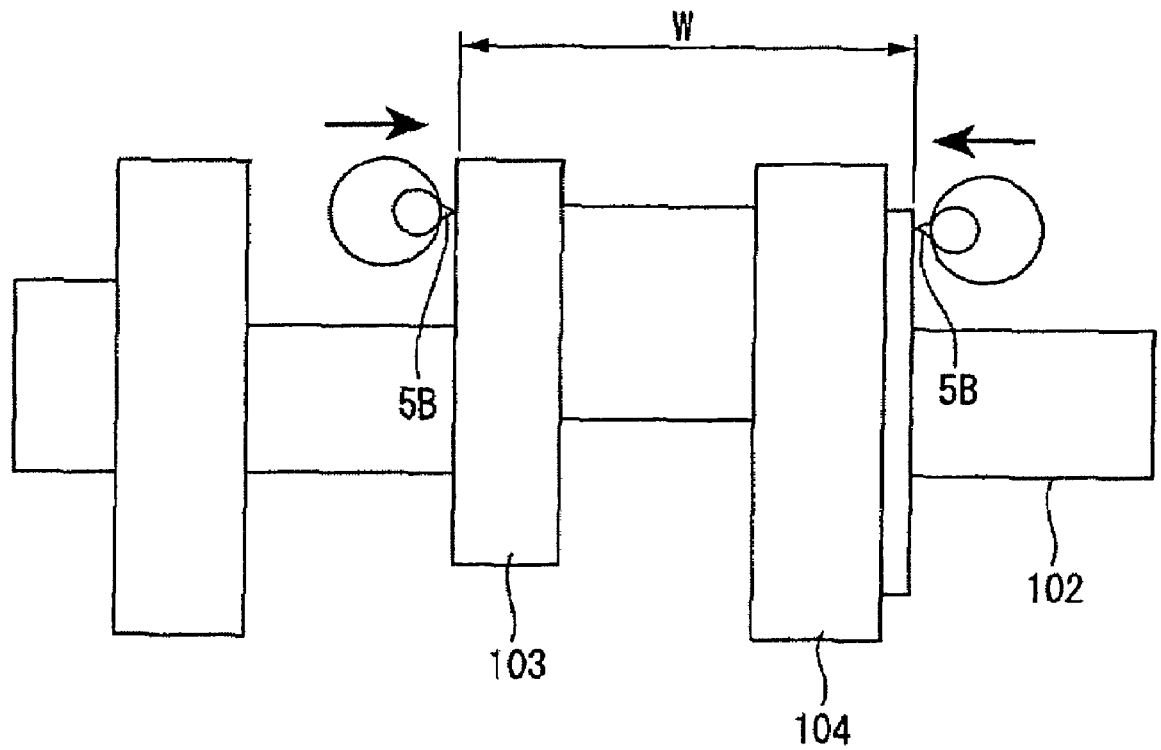
FIG. 10 is a diagram showing another measurement example in which the roughness detector is rotated in the embodiment of FIG. 1.

FIG. 10 shows an example of measuring a width dimension W between two flanges 103 and 104 formed to a crankshaft 102. First of all, with the posture that the sensing pin 5B is oriented sideward, the outer surface of the flange 103 is measured. Thereafter, the sensing pin 5B is so rotated as to be in the opposite sideward posture, and the outer surface of the other flange 104 is measured. In this manner, the width dimension W between the two flanges 103 and 104 may be measured. For example, used for such calculation are the displacement amount of the detector 5 from the Y-table position when the outer surface of the flange 103 is measured, the displacement amount of the detector 5 from the Y-table position when the outer surface of the flange 104 is measured, and two pieces of correction data for use of correcting the displacement amount of the detector 5 (Y+ posture correction data, and Y− posture correction data).

Figure 11:
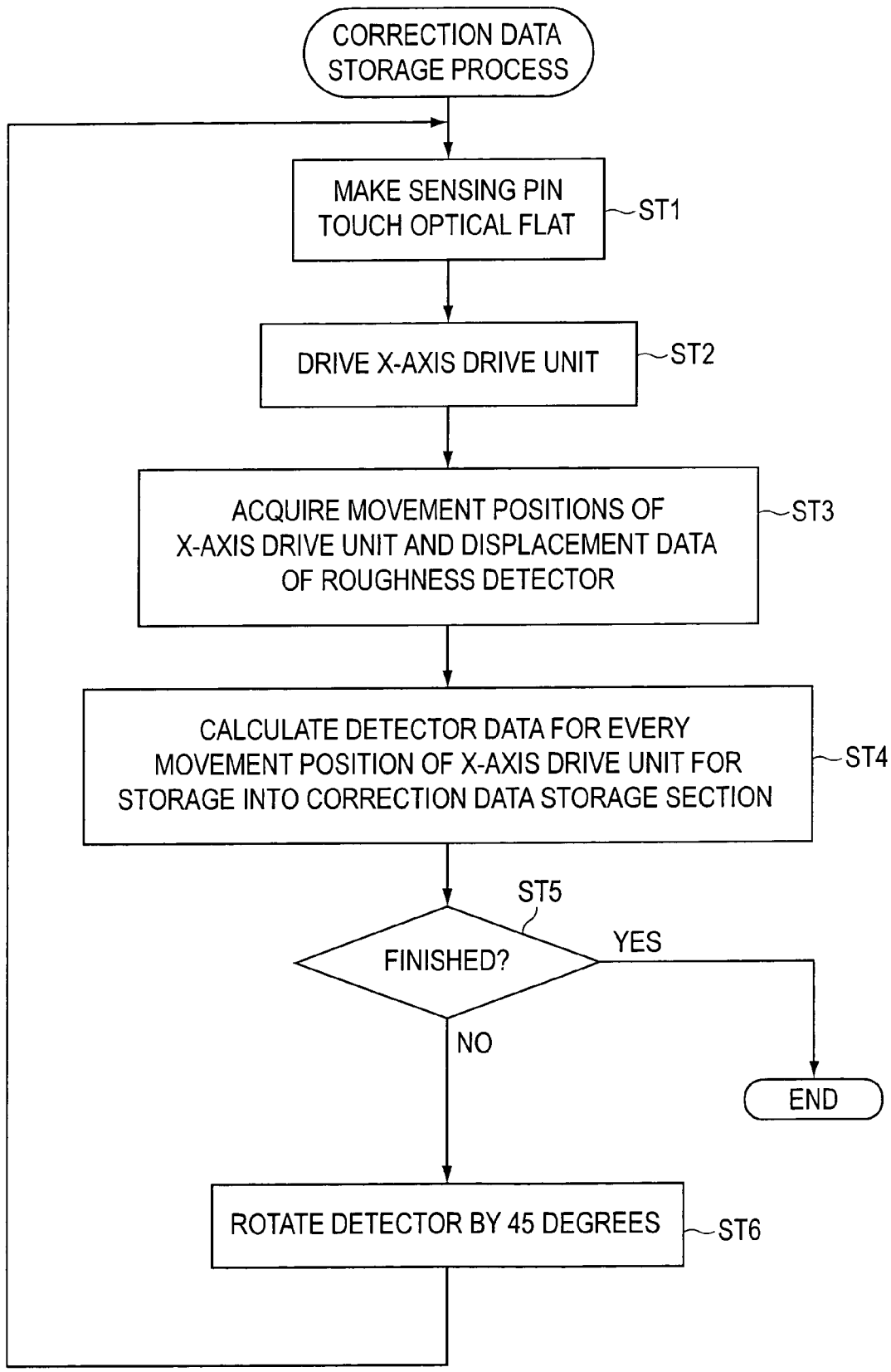
FIG. 11 is a flowchart of a correction data storage process of the embodiment of FIG. 1.
Figure 12:
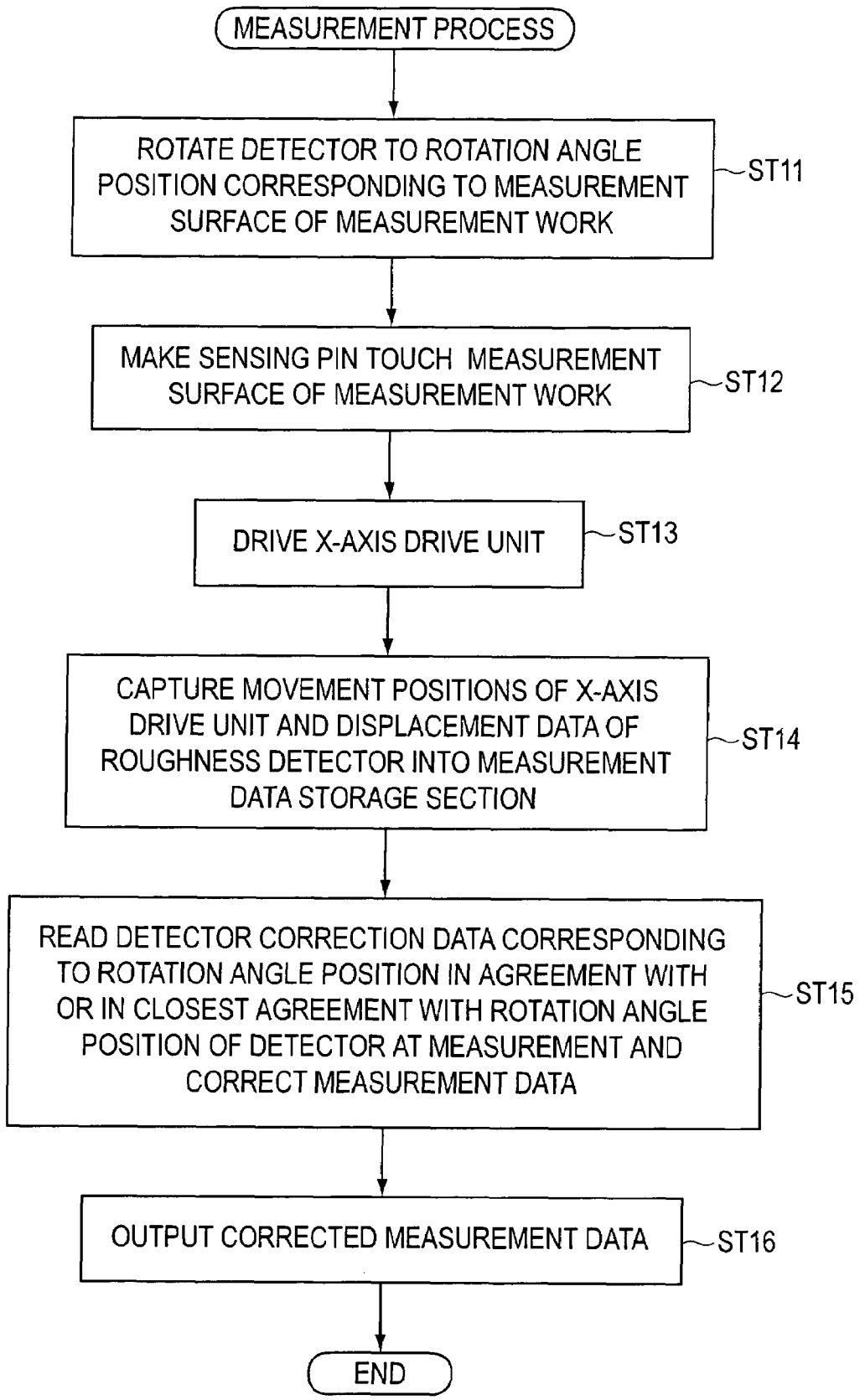
FIG. 12 is a flowchart of a measurement process of the embodiment of FIG. 1.

As shown in FIGS. 11 and 12, for execution of a straightness correcting method, a correction data storage step is first performed, and then a measurement step follows. In the measurement step, a measurement data acquisition step and a correction calculation step are performed.

In the correction data storage step, in relation to the rotation angle positions at which the roughness detector 5 (the stylus 5C) is set to each different rotation angel positions, detector correction data for each of the movement positions of the X-axis drive unit 3 are stored in the correction data storage section 9B. For example, as shown in FIG. 11, after the sensing pin 5B is touched onto an optical flat being a reference surface (ST1), the X-axis drive unit 3 is driven (ST2). While the X-axis drive unit 3 is being driven, the movement positions of the X-axis drive unit 3, and the displacement amount of the roughness detector 5 (displacement amount of the stylus 5C) are captured (ST3). The detector correction data is derived for each of the movement positions of the X-axis drive unit 3, and the results are stored in the correction data storage section 9B (ST4). Thereafter, a determination is made whether to end the procedure or not, i.e., a determination whether the measurement is performed for a preset number of times (ST5). If the determination is made not to end the procedure, the roughness detector 5 is rotated by 45 degrees (ST6), and the procedure of ST1 to ST5 is repeated. In this manner, in relation to the rotation angle positions at which the roughness detector 5 is set to each different angle positions, the detector correction data for each of the movement positions of the X-axis drive unit 3 may be stored in the correction data storage section 9B.

That is, the detector correction data at this time is stored into the correction data storage section 9B after the correction data is acquired based on the displacement amount at the rotation angle positions for every 45 degrees of the detector 5. At this time, the optical flat is disposed on the base in such a manner that the normal direction of the optical flat being the reference surface is the same as the displacement direction of the sensing pin 5B. For example, when the sensing pin 5B is at the rotation angle position directing sideward (90 degrees), the optical flat is disposed in such a manner that the optical flat being the reference surface is vertical (Z-axis direction).

Described herein is an example of acquiring the correction data for every 45 degrees. Alternatively, the correction data may be acquired for every required predetermined angle.

In the measurement step, first in the measurement data acquisition step, the roughness detector 5 is set by the detector rotation unit 4 to the rotation angle position corresponding to the measurement surface of the measurement work. Also, while the X-axis drive unit 3 is being driven in the state that the sensing pin 5B is being touched on the measurement surface of the measurement work, the movement positions of the X-axis drive unit 3, and the displacement amount of the roughness detector 5 (the displacement amount of the stylus 5C) are captured as measurement data. For example, as shown in FIG. 12, the roughness detector 5 is rotated (set) to reach the rotation angle position corresponding to the measurement surface of the measurement work (ST11), and then the sensing pin 5B is touched to the measurement surface of the measurement work (ST12) so that the X-axis drive unit 3 is driven (ST13). While the X-axis drive unit 3 is being driven, the movement positions of the X-axis drive unit 3 and the displacement amount of the roughness detector 5 (the displacement amount of the stylus 5C) are captured into the measurement data storage section 9C (ST14). That is, when the X-axis drive unit 3 is driven in the state that the detector rotation unit 4 sets the roughness detector 5 to the rotation angle position corresponding to the measurement surface of the measurement work, and in the state that the sensing pin 5B is being touched to the measurement surface of the measurement work, the movement positions of the X-axis drive unit 3 and the displacement amount of the roughness detector 5 are captured as the measurement data.

In the correction calculation step, any detector correction data in agreement with or in closest agreement with the rotation angle position of the roughness detector 5 at measurement is read from the correction data storage section 9B, and using the resulting detector correction data, the measurement data is accordingly corrected. For example, in ST15 of FIG. 12, any detector correction data in agreement with or in closest agreement with the rotation angle position of the roughness detector 5 at measurement is read from the correction data storage section 9B, and using the resulting detector correction data, the measurement data is accordingly corrected. Lastly, thus corrected measurement data is output (displayed, printed) (ST16).

Accordingly, even in a case where the roughness detector 5 is rotated for measurement, the measurement data is accordingly corrected based on the detector correction data corresponding to the rotation angle position in agreement with or in closest agreement with the rotation angle position of the roughness detector 5 at measurement. Therefore, the correction operation can be optically performed in consideration with the rotation angle position of the roughness detector 5 at measurement.

According to such an embodiment as above, the following effects may be achieved.

(1) With the detector rotation unit 4 that rotates the roughness detector 5 about an axis being substantially parallel to the axis of the stylus 5C, the sensing pin 5B may be changed in orientation depending on the measurement portion of the measurement work. For example, the sensing pin 5B may be changed in orientation to direct downward, sideward, upward, diagonally upward or downward, or others. This thus possibly increases the measurement area so that any arbitrary position on the inner radius surface of a hole becomes available for roughness measurement.

(2) Even if the roughness detector 5 is rotated for measurement, the measurement data is accordingly corrected based on the detector correction data corresponding to the rotation angle position in agreement with or in closest agreement with the rotation angle position of the roughness detector 5 at measurement. Therefore, the straightness can be optically corrected in consideration with the rotation angle position of the roughness detector 5 at measurement.

Furthermore, the correction data storage section 9B may store detector correction data at every possible movement position of the X-axis drive unit 3 in relation to various different rotation angle positions set to the roughness detector 5 to take for every 45 degrees. Therefore, even if the measurement is performed when the roughness detector 5 is located at the rotation angle position of 0 degree, 45 degrees, 90 degrees, or at any position close to such angles, the straightness measurement may be performed with high accuracy.

(3) Because the ball screw axis 47 is disposed inside of the guide rail 22 and inside of the slider 24 for driving the slider 24 that keeps hold of the roughness detector 5, the moment to be produced to the slider 24 may be suppressed to a further degree compared with conventional. Therefore, when the roughness detector 5 is moved, the posture change of the roughness detector 5 may be suppressed to possibly minimum so that the measurement can be performed with high accuracy for sure.

For example, the guide rail 22 is in the horizontally-oriented U-shape, the slider 24 is formed to configure a rectangular frame in cross section, and the ball screw axis 47 is disposed in the vicinity of the substantial center of four sliding surfaces of the guide rail 22 and the slider 24, i.e., disposed with friction force oriented. With such a configuration, the moment produced to the slider 24 is cancelled out, and the posture change of the roughness detector 5 may be suppressed with certainty.

(4) The guide rail 22 may be formed with the two guide surfaces 23A and 23B, which are so disposed as to form a predetermined angle therebetween, being both parallel to the movement direction of the roughness detector 5. The slider 24 is formed with the two sliding surfaces 25A and 25B, which are opposing to the two guide surfaces 23A and 23B. Therefore, any posture change observed in the direction orthogonal to these two guide surfaces 23A and 23B, and the sliding surfaces 25A and 25B, e.g., four directions of up and down, and right and left, can be suppressed to possibly minimum. Accordingly, even if the measurement is performed by changing the posture of the roughness detector 5, the straightness accuracy can be guaranteed while the posture change of the slider 24 is suppressed so that the measurement operation may be performed with accuracy.

(5) The biasing member 31 may be each provided to surfaces opposite to the two sliding surfaces 25A and 25B of the slider 24. With such a configuration, the slider 24 is biased in such a manner that the two sliding surfaces 25A and 25B of the slider 24 follow the two guide surfaces 23A and 23B of the guide rail 22 so that the slider 24 is moved with reference to the guide surfaces 23A and 23B of the guide rail 22. Therefore, accurately assuring the straightness of the two guide surfaces 23A and 23B accordingly guarantees the straightness accuracy when the slider 24, i.e., the roughness detector 5, is driven so that the measurement data may be corrected in straightness.

(6) The biasing member 31 is configured to include the leaf spring 32 whose one end is fixed to the slider 24, the sliding members 26C and 26D retained by the other end of the leaf spring 32, and the biasing force adjustment mechanism 36 that is provided to the side opposite to the sliding members 26C and 26D with the leaf spring 32 therebetween, and is capable of adjusting the biasing force to be applied to the guide rail 22. With such a configuration, through adjustment of the biasing force of the biasing force adjustment mechanism 36, the pressure of the sliding members 26C and 26D abutting the guide rail 22 can be arbitrarily set. As such, through appropriate adjustment of the pressure of the sliding members 26C and 26D abutting the guide rail 22, the slider 24 may be made to slide smoothly along the guide rail 22.

(7) The slider 24 and the nut member 48 may be coupled together via the universal joint 51 that allows small displacement of the nut member 48 in the direction axis-orthogonal to the ball screw axis 47. With such a configuration, any effects caused by the swing rotation of the ball screw axis 47 may be absorbed by the universal joint 51, and are not transmitted to the slider 24. Also in this respect, the straightness accuracy may be guaranteed when the slider 24 is moved.

In the straightness correcting method of the above-described embodiment, in the correction data storage step, in relation to the rotation angle positions at which the roughness detector 5 is set to a plurality of rotation angle positions for every 45 degrees, the detector correction data at the movement positions of the X-axis drive unit 3 are stored in the correction data storage section 9B, and at measurement, the measurement work is subjected to a measurement operation. Also, any detector correction data in agreement with or in closest agreement with the rotation angle position of the roughness detector 5 at that time is read from the correction data storage section 9B, and using the resulting detector correction data, the measurement data is accordingly corrected. This is surely not the only option, and the method of FIGS. 13 to 15 will also do.

Figure 13A:
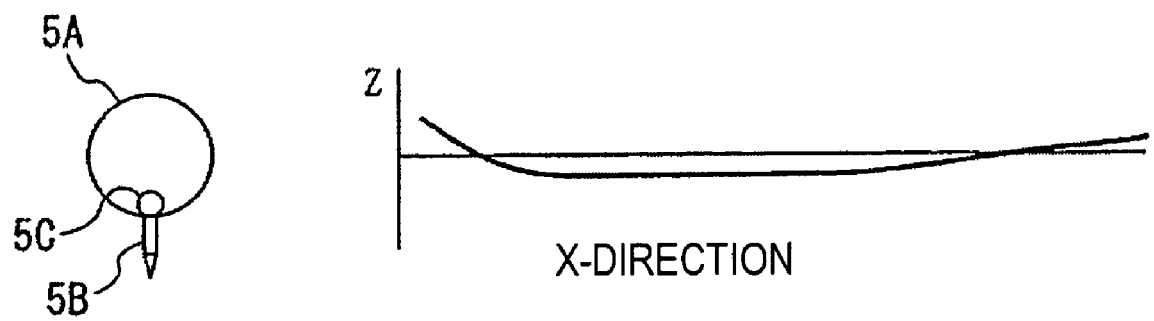
FIG. 13 is a diagram showing detector correction data stored in a correction data storage section in another exemplary embodiment.
Figure 13B:
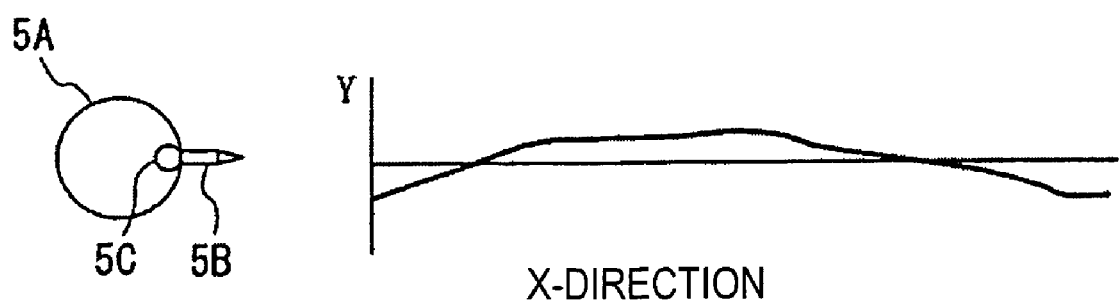

In the method shown in FIGS. 13-16, first in the correction data storage step, in relation to the rotation angle positions at which the roughness detector 5 may be set to two different rotation angle positions with 90-degree difference therebetween, the detector correction data for each of the movement positions of the X-axis drive unit 3 are stored into the correction data storage section 9B. For example, as shown in FIG. 13, in relation to the rotation angle position (0 degree) when the sensing pin 5B is oriented downward, and the rotation angle position (90 degrees) when the sensing pin 5B is oriented sideward, the detector correction data for each of the movement positions of the X-axis drive unit 3 are stored into the correction data storage section 9B.

Figure 14:
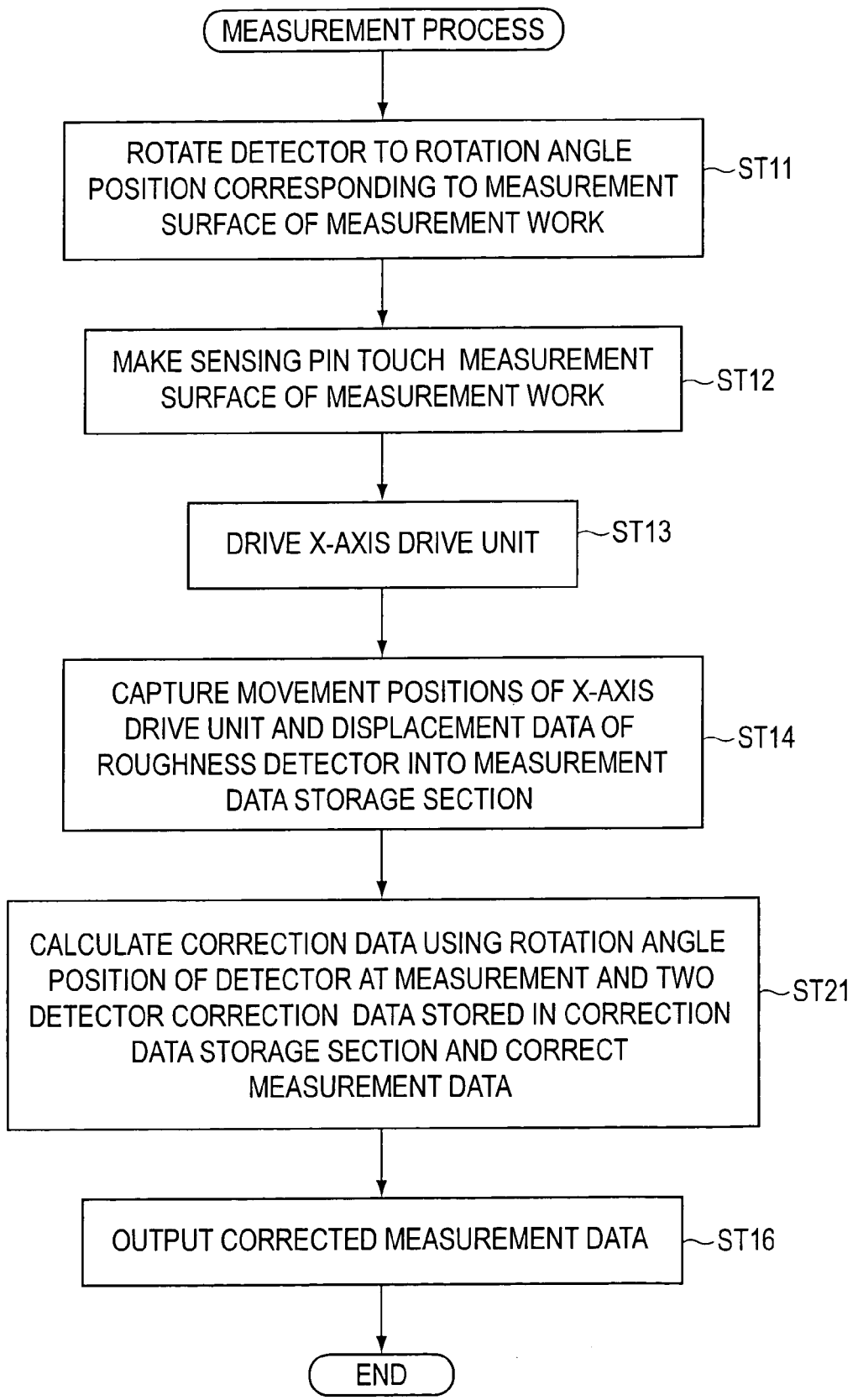
FIG. 14 is a flowchart of a measurement process of the other embodiment.

At measurement, as shown in FIG. 14, first in the measurement data acquisition step, after measurement data may be acquired through a measurement operation executed to a measurement work (the same procedure as ST11 to ST14), in the correction calculation step, a calculation operation is then executed to derive correction data corresponding to the rotation angle position of the roughness detector 5 at measurement based on the rotation angle position of the roughness detector 5 at measurement, and the two detector correction data stored in the correction data storage section 9B. Using the resulting correction data, the measurement data is accordingly corrected (ST21).

Figure 15:
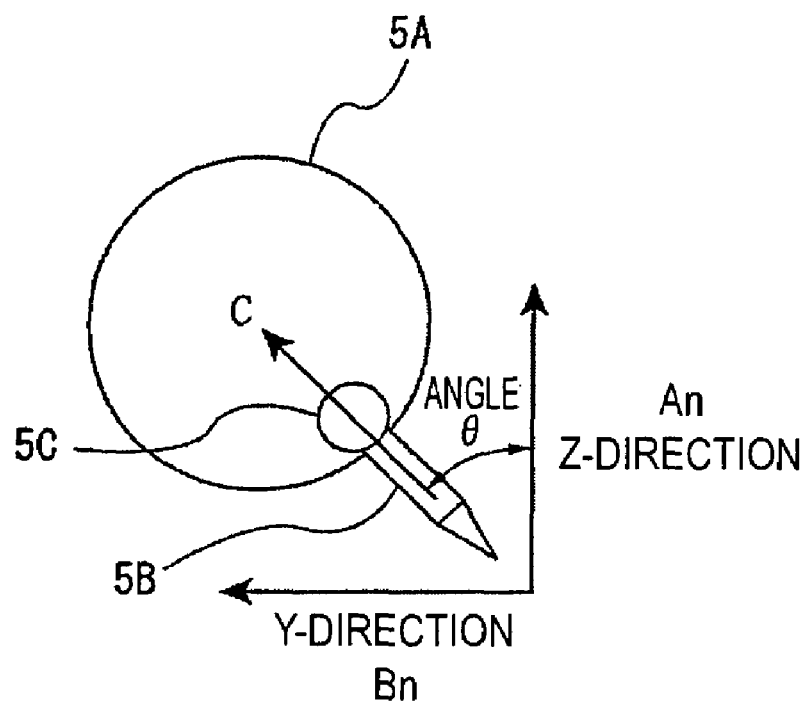
FIG. 15 is a diagram showing the measurement state in which the detector is tilted by θ in the other embodiment.

For example, as shown in FIG. 15, when the rotation angle position of the roughness detector 5 at measurement is oriented diagonally downward (when the sensing pin 5B is tilted by $\theta$ degree with respect to the vertical direction), the correction data is calculated in the following manner. Assuming here that, at a specific movement position P of the X-axis drive unit 3, the correction data in the 0-degree direction is [An (where n=1, 2, 3, ...)], and the correction data in the 90-degree direction is [Bn (where n=1, 2, 3, ...)] correction data Cn at the position P (where n=1, 2, 3, ...) is calculated from the following equation.

$$Cn = An \cdot \cos\theta + Bn \cdot \sin\theta \tag{1}$$

Herein, An is A1, A2, A3 ..., and Bn is B1, B2, B3 ..., and is correction data for each corresponding specific movement positions of the X-axis drive unit 3. The resulting calculated C1, C2, C3, ... are correction data at the position P for their each corresponding specific movement positions of the X-axis drive unit 3.

Thereafter, by subtracting the correction data derived by the above equation from the measurement data, the measurement data is accordingly corrected.

In this method, it is considered preferable that, in the configuration, the normal directions of the two guide surfaces 23A and 23B are the same as the directions of the two rotation angle positions (0 degree and 90 degrees), and the normal directions of the guide surfaces 23A and 23B are the same as the Z-axis direction and the Y-axis direction, respectively. However, such a configuration is not an only option, and the directions of the two rotation angle positions and the normal directions of the two guide surfaces 23A and 23B are not necessarily be the same. Similarly, the intersection angle of the two guide surfaces 23A and 23B is not necessarily be 90 degrees, and may be 85 degrees, for example. Moreover, the normal directions of the guide surfaces may not be the same as the Z-axis direction and the Y-axis direction.

Also, in this method, in the correction data storage step, in relation to the rotation angle positions at which the roughness detector 5 is set to two different rotation angle positions with a difference of a predetermined angle therebetween, the detector correction data for each of the movement positions of the X-axis drive unit 3 may be stored in the correction data storage section 9B.

Figure 16:
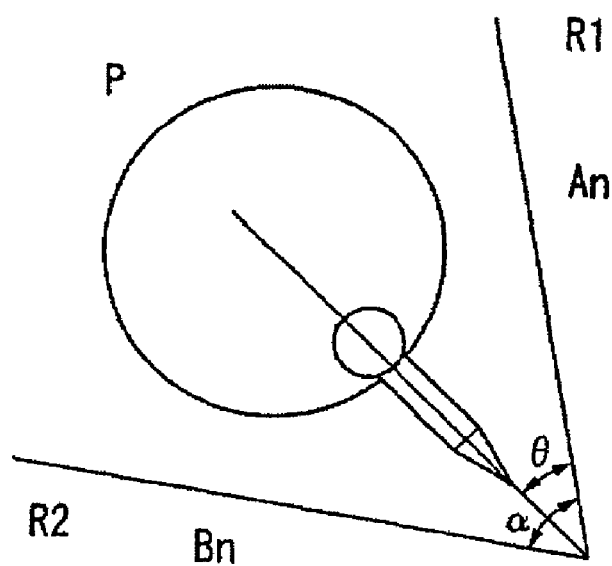
FIG. 16 is a diagram showing another measurement state in which the detector is tilted by θ in the other embodiment.

For example, as shown in FIG. 16, in the correction data storage step, correction data [An (where n=1, 2, 3, ...)] is acquired at a first rotation angle position (R1), and correction data [Bn (where n=1, 2, 3, ...)] is acquired at a second rotation angle position (R2). When the roughness detector 5 is at the rotation angle position of R in the measurement data acquisition step, the correction data is calculated as below.

$$Cn = An \cdot \cos\theta + Bn \cdot \cos(\alpha - \theta) \tag{2}$$

Herein, $\alpha$ is an intersection angle between the first rotation angle position (R1) and the second rotation angle position (R2), and $\theta$ is an angle at which the rotation angle position R at measurement intersects with the first rotation angle position (R1). Also, for example, An is A1, A2, A3, ..., and Bn is B1, B2, B3, .... The resulting calculated C1, C2, C3, ... are correction data at the position P for their each corresponding specific movement position of the X-axis drive unit 3.

Thereafter, by subtracting the correction data derived by the above equation from the measurement data, the measurement data is accordingly corrected.

Also, in this method, exemplified in the correction data storage step is a case of acquiring correction data An and Bn only at two different rotation angle positions of the roughness detector 5. Alternatively, correction data Kn, Ln, Mn, and others may be acquired at three or more different rotation angle positions of R1, R2, R3, .... With this being the case, detector correction data in agreement with or in closest agreement with the rotation angle position P of the roughness detector 5 in the measurement data acquisition step is read from the correction data storage section 9B, and using the resulting detector correction data, the measurement data can be corrected. Still alternatively, using two correction data (e.g., Kn and Ln) showing the close rotation angle positional relationship with the rotation angle position P (R1 and R2 with the smaller intersection angle), the correction data Cn may be derived by the equation (2).

For calculation of the correction data Cn, using various combinations of two correction data (e.g., three combinations of Kn and Ln, Ln and Mn, and Mn and Kn), with the equation (2), a plurality of correction data Cna, Cnb, Cnc, ... may be derived and averaged so as to derive the detector correction data Cn.

When the correction data Kn, Ln, Mn, and others are acquired with three or more different rotation angle positions (R1, R2, R3, ...), the correction data Cn when the roughness detector 5 is at the rotation angle position P in the measurement data acquisition step may be derived by the following equation.

$$Cn = Kn \cdot \cos\theta_1 + Ln \cdot \cos\theta_2 + Mn \cdot \cos\theta_3 + \tag{3}$$

Herein, $\theta_1$, $\theta_2$, $\theta_3$, ... are angles (intersection angles) formed by the rotation angle position P with the rotation angle positions R1, R2, R3, ....

Thereafter, thus derived correction data is subtracted from the measurement data so that the measurement data is accordingly corrected.

Accordingly, even if the roughness detector 5 is rotated for measurement, the correction data for the rotation angle position of the roughness detector 5 at measurement is calculated based on the rotation angle position of the roughness detector 5 at measurement, and two detector measurement data stored in the correction data storage section 9B, and using the resulting correction data, the measurement data is accordingly corrected. Therefore, the measurement operation can be performed in an optimal manner depending on the rotation angle position of the roughness detector 5 at measurement. For example, there only needs for the correction data storage section 9B to store detector correction data for the movement positions of the X-axis drive unit 3 in relation to at least two different rotation angle positions with a difference of 90 degrees therebetween (0 degree, 90 degrees) of the roughness detector 5 so that the correction operation can be optimally performed with the less amount of data.

Also in the embodiment, exemplified is a case of rotating the detector 5 in the Y-Z plane. This is surely not restrictive, and the detector 5 may rotate in the X-Z plane or the X-Y plane. As an example, the detector 5 may be rotatable in the X-Z plane, and a measurement work may be driven in the Y-axis direction by a Y-axis table for measurement. With this being the case, it is preferable that the straightness of two guide surfaces of the guide rail in the Y-axis drive unit for driving the Y-axis table is guaranteed with high accuracy.

As another example, the detector 5 may be rotatable in the X-Y plane, a cylindrical measurement work may be disposed on a rotation table, and the detector 5 may be driven in the Z-axis direction for measurement of the outer side surface (or inner side surface) of the measurement work. With this being the case, it is preferable that the straightness of two guide surfaces of the guide rail in the Z-axis drive unit is guaranteed with high accuracy.

Herein, as to the relative movement of the detector and the measurement work, either the detector or the measurement work, or both may be moved.

What is more, as the detector 5, exemplified is a touch-type detector using a sensing pin. This is surely not the only option, and a no-touch-type detector will do as long as being capable of surface texture measurement, or a detector of an optical type, electromagnetic type, electrostatic type, or others will also do.

As a measurement method, exemplified is a measurement method through scanning using a sensing pin. The measurement method may also be applicable with a coordinate measurement method using a touch signal probe, follower probe, or the like.

What is more, in this embodiment, exemplified is a configuration that only the guide rail 22 of the X-axis drive unit 3 is including the two guide surfaces 23A and 23B each serving as a straightness reference surface. Alternatively, the Z-axis drive unit 6 or a Y-axis drive unit may similarly include a plurality of guide surfaces.

To change the relative posture of the detector and the measurement work, rotation is not the only option, and tilting (tilting angle change) or parallel movement will also do. For example, in the configuration that the detector 5 is supported by protruding from the slider 24 in the X-axis direction or Y-axis direction, i.e., over hanging, the surface texture measuring instrument may also have the configuration of changing the over-hanging amount into several different values (posture change).

The surface texture measuring instrument may also have a detector that is changed in relative posture by the X-axis drive unit or the Z-axis drive unit, or the Y-axis drive unit itself tilting or rotating.

Moreover, exemplified as the surface texture measuring instrument is a surface roughness gauge. The surface texture measurement instrument may also be other instruments, such as a contour measuring instrument, an out-of-roundness measuring instrument, an image measuring instrument, a three-dimensional measuring instrument, or the like.

The systems and methods may be applicable to a surface roughness measuring instrument for measuring the surface roughness of a measurement work, and a contour measuring instrument for measuring the surface rising and falling, the contour, or others of a measurement work.

While various details have been described, these details should be viewed as illustrative, and not limiting. Various modifications, substitutes, improvements or the like may be implemented within the spirit and scope of the foregoing disclosure.

What is claimed is:

1. A straightness correcting method for a surface texture measuring instrument provided with a detector that detects a surface texture of a measurement work, a drive unit that moves the detector relatively to a measurement direction, and a detector posture change mechanism that changes the detector in posture, comprising:
    a correction data storage step of storing, to a storage device, detector correction data derived for a plurality of movement positions of the drive unit in relation to each of different postures set to the detector to take;
    a measurement data acquisition step of acquiring, at measurement, as measurement data, movement positions of the drive unit and a detection amount of the detector while driving the drive unit in a state in which the detector is set by the detector posture change mechanism to a posture corresponding to a measurement surface of the measurement work, and in a state in which the detector is made capable of detecting a surface texture of the measurement surface of the measurement work; and
    a correction calculation step of reading out from the detector correction data in the storage device a posture that is in agreement with or in substantial agreement with the posture of the detector at measurement, and correcting the measurement data using detector correction data associated with the posture read out from the storage device.

2. The straightness correcting method for the surface texture measuring instrument according to claim 1, wherein:
    the correction data storage step stores, to the storage device, the detector correction data derived for the movement positions of the drive unit in relation to each of the postures set to the detector to take at a predetermined interval.

3. The straightness correcting method of claim 1, wherein the plurality of movement positions includes every movement position of the drive unit.

4. The straightness correcting method of claim 1, wherein:
    the detector includes a stylus extending in a direction substantially parallel to the measurement direction, and a sensing pin that extends in a direction substantially perpendicular to the measuring direction, and
    a posture set to the detector to take is a rotation angle position of the detector, the rotation angle position defining an angle in which the sensing pin rotates about the measurement direction in a plane substantially perpendicular to the measuring direction.

5. A straightness correcting method for a surface texture measuring instrument provided with a detector that detects a surface texture of a measurement work, a drive unit that moves the detector relatively to a measurement direction, and a detector posture change mechanism that changes the detector in posture, comprising:
a correction data storage step of storing, to a storage device, detector correction data derived for a plurality of movement positions of the drive unit in relation to each of at least two different postures set to the detector to take;
a measurement data acquisition step of acquiring, at measurement, as measurement data, movement positions of the drive unit and a detection amount of the detector while driving the drive unit in a state in which the detector is set by the detector posture change mechanism to a posture corresponding to a measurement surface of the measurement work, and in a state in which the detector is made capable of detecting a surface texture of the measurement surface of the measurement work; and
a correction calculation step of calculating correction data in agreement with the posture of the detector at measurement based on the posture of the detector at measurement, and at least two postures from the detector correction data stored in the storage device, and correcting the measurement data using two sets of correction data associated with the two postures, respectively.

6. The straightness correcting method of claim 5, wherein the plurality of movement positions includes every movement position of the drive unit.

7. The straightness correcting method of claim 5, wherein:
the detector includes a stylus extending in a direction substantially parallel to the measurement direction, and a sensing pin that extends in a direction substantially perpendicular to the measuring direction, and
a posture set to the detector to take is a rotation angle position of the detector, the rotation angle position defining an angle in which the sensing pin rotates about the measurement direction in a plane substantially perpendicular to the measuring direction.

8. A surface texture measuring instrument provided with a detector that supports, to be displaceable, a stylus having a sensing pin at a tip end to be touched on a surface of a measurement work, a drive unit that moves the detector relatively to a measurement direction, and a detector rotation mechanism that rotates the detector about an axis being substantially parallel to an axis of the stylus, comprising:
a correction data storage device that stores detector correction data derived for a plurality of movement positions of the drive unit in relation to each of different rotation angle positions set to the detector to take;
a measurement data storage device that stores at measurement, as measurement data, movement positions of the drive unit and a displacement amount of the detector when the drive unit is driven in a state in which the detector is set by the detector rotation mechanism to a rotation angle position corresponding to a measurement surface of the measurement work, and in a state in which the sensing pin is being touched on the measurement surface of the measurement work; and
a correction calculation device that reads out from the detector correction data stored in the correction data storage device a rotation angle position that is in agreement with or in substantial agreement with the rotation angle position of the detector at measurement, and corrects the measurement data stored in the measurement data storage device using detector correction data associated with the rotation angle position read out from the storage device.

9. The surface texture measuring instrument of claim 8, wherein the plurality of movement positions includes every movement position of the drive unit.

10. A surface texture measuring instrument provided with a detector that supports, to be displaceable, a stylus having a sensing pin at a tip end to be touched on a surface of a measurement work, a drive unit that moves the detector relatively to a measurement direction, and a detector rotation mechanism that rotates the detector about an axis being substantially parallel to an axis of the stylus, comprising:
a correction data storage device that stores detector correction data derived for a plurality of movement positions of the drive unit in relation to each of at least two rotation angle positions set to the detector to take with a difference of a predetermined angle therebetween;
a measurement data storage device that stores, at measurement, as measurement data, the movement positions of the drive unit and a displacement amount of the detector when the drive unit is driven in a state in which the detector is set by the detector rotation mechanism to a rotation angle position corresponding to a measurement surface of the measurement work, and in a state in which the sensing pin is being touched on the measurement surface of the measurement work; and
a correction calculation device that calculates correction data in agreement with the rotation angle position relation angle positions from the detector at measurement based on the rotation angle position of the detector at measurement, and at least two rotation angle positions from detector correction data stored in the correction data storage device, and correcting the measurement data using correction data respectively associated with the two rotation angle positions stored in the correction data storage device.

11. The surface texture measuring instrument of claim 10, wherein the plurality of movement positions includes every movement position of the drive unit.

* * * * *